No. 815,345. PATENTED MAR. 20, 1906.
G. A. GULOWSEN.
SPEED VARYING MECHANISM.
APPLICATION FILED JULY 13, 1905.

Witnesses.
H. M. Kisner Jr.
H. W. Kisner.

Inventor.
Gulow A. Gulowsen

UNITED STATES PATENT OFFICE.

GULOW ADOLPH GULOWSEN, OF HUGUENOT PARK, NEW YORK.

SPEED-VARYING MECHANISM.

No. 815,345.     Specification of Letters Patent.     Patented March 20, 1906.

Application filed July 13, 1905. Serial No. 269,519.

*To all whom it may concern:*

Be it known that I, GULOW ADOLPH GU-LOWSEN, a citizen of the United States, residing at Huguenot Park, in the county of Richmond and State of New York, have invented new and useful Improvements in Speed-Varying Mechanisms, of which the following is a specification.

My invention relates to speed-varying mechanisms in which a belt is used to transmit power from one expansible pulley to another the acting belt diameters of which may be varied by moving certain elements of the pulleys lengthwise their shafts; and the objects of my improvements are, first, to provide means for the convenient and quick moving of the elements of the expansible pulleys to correctly vary the acting belt diameters and maintain the belt length and tension practically constant; second, to reduce friction, both that of the shafts in their bearings due to the tendency of the belt to pull the shafts toward one another and that due to the end thrust of the pulley elements, which thrust is usually taken by collars. I attain these objects by the mechanism illustrated in the accompanying drawings, in which—

Figure 1:
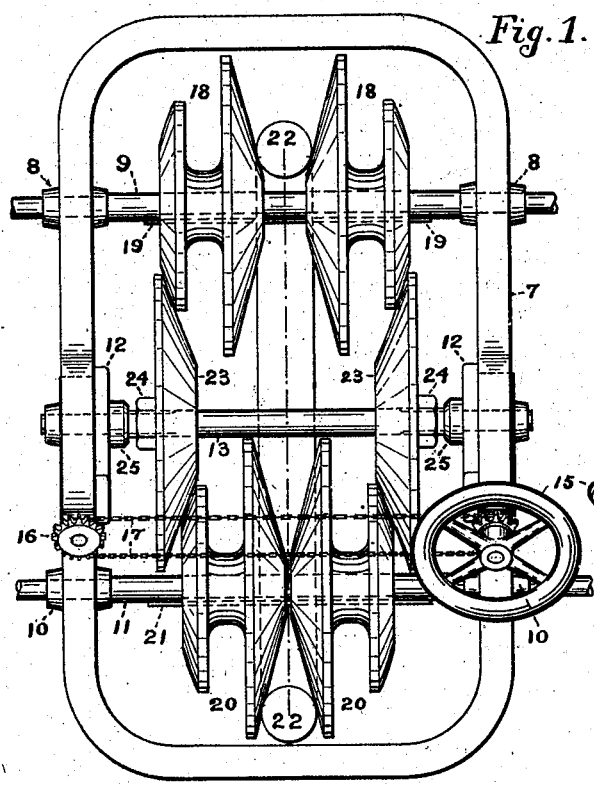
Figure 2:
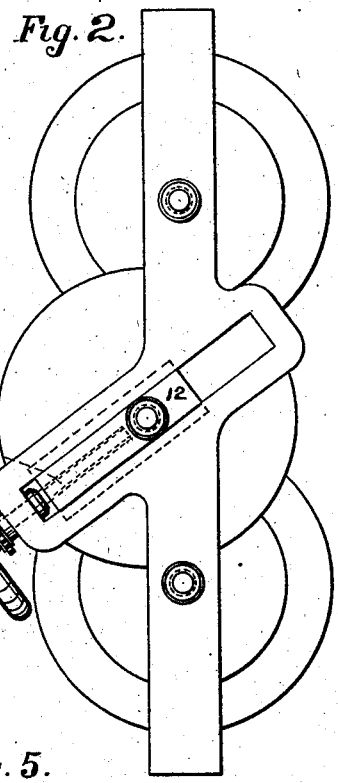
Figures 3, 4:
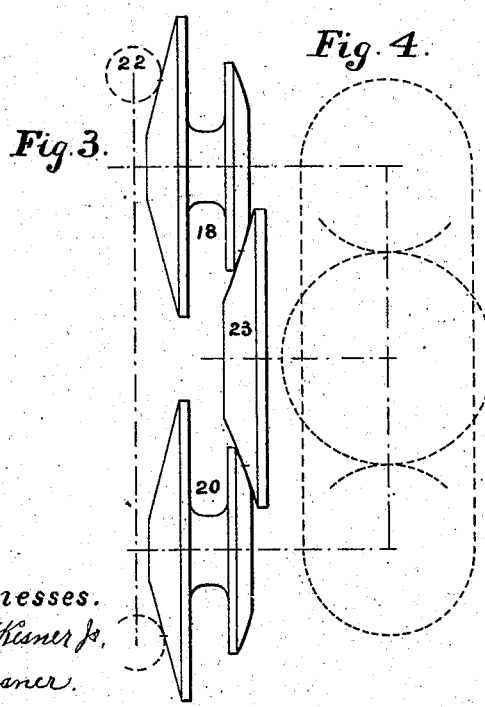
Figures 5, 6:
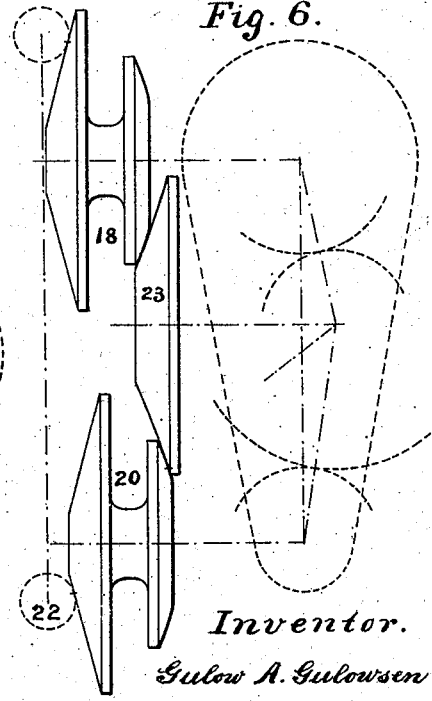

Figure 1 is a front view. Fig. 2 is an end view. Figs. 3 and 4 are diagrams showing the relative position of component parts when the belt is on equal diameters of the expansible pulleys. Figs. 5 and 6 are diagrams showing component parts in the opposite positions of those in Figs. 1 and 2.

The frame 7 has the bearings 8 8 for the shaft 9 and the bearings 10 10 for the shaft 11 and has also guides for the sliding blocks 12 12, in which are bearings for the shaft 13. The sliding blocks are adjustable simultaneously and equal distances in the same direction by means of screws 14 14, which are operated in unison by the hand-wheel 15 and the sprocket-wheels 16 16 and chain 17. The shaft 9 has mounted on it an expansible pulley comprising elements 18 18 with adjacent conical sides and slidable endwise on the shaft, a spline 19 preventing relative rotary motion. The shaft 11 has a similar expansible pulley 20 and spline 21. A belt 22, being in frictional contact with the conical sides of pulleys 18 and 20, transmits motion from one to the other.

The element-moving cone-shaped wheels 23 23 are keyed to shaft 13, but adjustable lengthwise to get proper belt tension and to take up wear, by means of the nuts 24 24. The collars 25 25 are on shaft 13 to retain it in proper position endwise.

By moving shaft 13 with its cone-shaped wheels 23 23 parallelly toward one of the pulley-shafts the advancing sides of these wheels in contact with the endwise-movable elements of the approached expansible pulley will force these elements toward one another, and thus compel the belt to take a larger diameter, and as the belt has a practically constant length it will take a smaller diameter on the other expansible pulley and in doing this force the elements of this pulley to contact with the receding sides of the cone-shaped wheels 23 23. It will thus be understood that the sides of the wheels 23 23 are constantly in contact with both elements of both expansible pulleys. The ratio between the acting diameters of the hubs of elements 18 18, wheels 23 23, and the hubs of elements 20 20 remains practically the same as that between the simultaneously-acting belt diameters.

I prefer to make the backs or hubs of the expansible pulley elements 18 20 slightly convex and the cone-shaped wheels 23 23 slightly concave to obtain individual circumferential contact-lines between the wheels and the hubs corresponding to the various belt diameters, and thus increase the wearing-surfaces of the hubs of these elements. This will be understood from the drawings. As shown in Fig. 1, the belt 22 is at the smallest acting diameter of the pulley 18, the points of contact between wheels 23 23 and hubs 18 18 are in the smallest acting circumferences of hubs 18 18 and in the largest of wheels 23 23, the points of contact between wheels 23 23 and hubs 20 20 are in the smallest acting circumferences of 23 23 and in the largest of 20 20, and the belt is at the largest acting diameter of pulley 20. As shown in Figs. 3 and 4, the belt is at the mean diameters of the expansible pulleys 18 20, and the points of contact between wheel 23 and hubs 18 and 20 are in the mean circumferences of these hubs and wheel. As shown in Figs. 5 and 6, the belt is at the largest acting diameter of 18, the point of contact between wheel 23 and hub 18 is in the largest acting circumference of 18 and in the smallest of 23, the point of contact between wheel 23 and hub 20 is in the largest acting circumference of 23 and in the smallest of 20, and the belt is at the smallest acting diameter of pulley 20.

I prefer the path for the lateral adjustment of the shaft 13 to be in an oblique direction relative to the plane of the pulley-shafts. The sides of the cone-shaped wheels 23 23 take the end pressures caused by the wedging action of the belt on the conical sides of the expansible pulley elements and also counteract the tendency of the belt to pull the shafts toward one another. Some rubbing action will take place between the hubs of the pulley elements and the cone-shaped wheels; but as these are not intended to transmit power, this being done by the belt, the contact-surfaces may be kept lubricated and the wear and loss of efficiency reduced to a minimum.

The construction has obvious advantages of simplicity, great range in speed variation, and in adaptability to large power-transmission.

I desire it to be understood that I do not limit myself to the specific construction hereinbefore described, as it is obvious the details may be modified without departing from the spirit of the invention.

I am aware that prior to my invention speed-varying mechanisms have been made with expansible pulleys driven by belt. I therefore do not claim such combination broadly, but

I claim—

1. In a speed-varying mechanism, in combination, driving and driven shafts, on each an expansible pulley, a belt connecting the pulleys; a pair of wheels approximately cone-shaped, the sides of which are in contact with the backs or hubs of the movable elements of both pulleys, said wheels being movable laterally to vary the lengthwise distances between each pair of the pulley elements.

2. In a speed-varying mechanism in combination, driving and driven shafts, on each an expansible pulley, a belt connecting the pulleys; a pair of wheels with adjacent concave sides in contact with convex hubs on the lengthwise-movable elements of the expansible pulleys; a shaft for said wheels, with means for their endwise adjustment; bearings for said shafts, adjustable equal distances simultaneously, to maintain the shaft parallel to the pulley-shafts, in a lateral direction and obliquely, relative to the plane of the pulley-shafts; and suitable means for said adjustment.

GULOW ADOLPH GULOWSEN.

Witnesses:
HARRY C. MILLER,
J. R. HUGI.